(12) United States Patent
Uruma (10) Patent No.: US 9,483,630 B2
(45) Date of Patent: Nov. 1, 2016

(54) INFORMATION PROCESSING APPARATUS, METHOD OF CONTROLLING THE SAME AND STORAGE MEDIUM

(71) Applicant: CANON KABUSHIKI KAISHA, Tokyo (JP)

(72) Inventor: Shuichi Uruma, Kawaguchi (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 14/534,565

(22) Filed: Nov. 6, 2014

(65) Prior Publication Data

US 2015/0150117 A1 May 28, 2015

(30) Foreign Application Priority Data

Nov. 26, 2013 (JP) ................................. 2013-244332

(51) Int. Cl.
G06F 7/04 (2006.01)
G06F 21/31 (2013.01)
G06F 21/45 (2013.01)

(52) U.S. Cl.
CPC .............. G06F 21/31 (2013.01); G06F 21/45 (2013.01)

(58) Field of Classification Search
CPC ................................ G06F 21/31; G06F 21/45
USPC .......................................................... 726/16
See application file for complete search history.

(56) References Cited

U.S. PATENT DOCUMENTS

| | | | |
|---|---|---|---|
| 7,058,332 B2 | 6/2006 | Moroi | |
| 7,362,983 B2 | 4/2008 | Moroi | |
| 7,574,156 B2 | 8/2009 | Moroi | |
| 7,809,297 B2 | 10/2010 | Moroi | |
| 8,045,961 B2* | 10/2011 | Ayed | G08B 1/08 455/41.1 |
| 8,064,789 B2 | 11/2011 | Moroi | |
| 8,380,099 B2 | 2/2013 | Moroi | |
| 8,610,934 B2 | 12/2013 | Uruma | |
| 8,682,193 B2 | 3/2014 | Moroi | |
| 8,844,027 B2 | 9/2014 | Uruma | |
| 2004/0258429 A1 | 12/2004 | Moroi | |
| 2006/0188282 A1 | 8/2006 | Moroi | |
| 2008/0226327 A1 | 9/2008 | Moroi | |
| 2009/0263152 A1 | 10/2009 | Moroi | |
| 2011/0044714 A1 | 2/2011 | Moroi | |
| 2011/0313922 A1* | 12/2011 | Ben Ayed | G06Q 20/108 705/42 |
| 2012/0019361 A1* | 1/2012 | Ben Ayed | G06F 21/32 340/5.83 |
| 2012/0019379 A1* | 1/2012 | Ben Ayed | G08B 13/1436 340/539.1 |
| 2012/0039621 A1 | 2/2012 | Moroi | |
| 2013/0141754 A1 | 6/2013 | Moroi | |
| 2013/0298208 A1* | 11/2013 | Ayed | G06F 21/00 726/6 |
| 2014/0160518 A1 | 6/2014 | Moroi | |

FOREIGN PATENT DOCUMENTS

JP 4409970 B2 2/2010

* cited by examiner

*Primary Examiner* — Teshome Hailu
(74) *Attorney, Agent, or Firm* — Fitzpatrick, Cella, Harper & Scinto

(57) ABSTRACT

An information processing apparatus, a method of controlling the same, and a non-transitory computer-readable storage medium. The information processing apparatus comprises management unit configured to manage a login application at least having both a login screen display function and a user authentication function. The apparatus, in a case where a plug-in module, having one function out of the login screen display function and the user authentication function, is added to the information processing apparatus, enables the function of the plug-in module, and enables the function of the login application other than the function of the plug-in module.

10 Claims, 8 Drawing Sheets

| No | LOGIN APPLICATION NAME | USING |
|---|---|---|
| 1 | DEFAULT LOGIN APPLICATION | 1 |
| 2 | CUSTOM LOGIN APPLICATION | 0 |

| MODULE | NAME | ACCESS PATH | UNUSABLE SITUATION |
|---|---|---|---|
| LOCAL LOGIN SCREEN PROCESSING SECTION | CustomLocalLoginScreen | – | VNC CONNECTION |
| USER AUTHENTICATION PROCESSING SECTION | CustomAuthentication | LOCAL | – |

| MODULE | ENABLE TYPE | STATUS |
|---|---|---|
| LOCAL LOGIN SCREEN PROCESSING SECTION | REPLACE | ENABLED |
| WEB BROWSER LOGIN SCREEN PROCESSING SECTION | REPLACE | DISABLED |
| USER AUTHENTICATION PROCESSING SECTION | COEXISTENCE | DISABLED |

INFORMATION PROCESSING APPARATUS, METHOD OF CONTROLLING THE SAME AND STORAGE MEDIUM

BACKGROUND OF THE INVENTION

1. Field of the Invention

The present invention relates to an information processing apparatus, a method of controlling the same, and a storage medium.

2. Description of the Related Art

A multi function peripheral (an MFP: Multi-Function Peripheral) equipped with functions such as copying, printing, scanning, and FAX transmission and reception is known. By further equipping this kind of MFP with a user authentication function, it becomes possible to restrict a usage of the MFP. In other words, only a user who receives an authentication as a legitimate user of the MFP is able to use the MFP.

There is demand for customization of such a function for authenticating users, i.e. a login function; there is a desire to change the function, to match an operation environment of customers, from standard functions that the MFP is provided with. For example, there is a desire to use an IC card reader, a vein authentication apparatus, or the like, as an authentication apparatus. Also, there is desire to change a design of a login screen for allowing a user to input authentication information, and a desire to change a database which is a destination for verification of inputted user authentication information to a dedicated server separate from the MFP.

As an approach to handling such various demands, a way of customizing a login function of an MFP has been proposed in, for example, Japanese Patent No. 4409970.

However, in the approach to customization of the login function shown in Japanese Patent No. 4409970, there is the problem that because an implementation of a complete set of login functions is required, many man-hours for development for customization are required.

Also, there is a desire to operate a program module created by a conventional customization approach when customizing the login function.

SUMMARY OF THE INVENTION

An aspect of the present invention is to eliminate the above-mentioned problems with the conventional techniques.

A feature of the present invention is to provide a technique of customizing a program with less man-hours of development while maintaining compatibility with applications customized by a conventional customization approach.

According to an aspect of the present invention, there is provided an information processing apparatus comprising a management unit configured to manage a login application at least having both a login screen display function and a user authentication function; and an enabling unit configured to, in a case where a plug-in module, having one function out of the login screen display function and the user authentication function, is added to the information processing apparatus, enable the function of the plug-in module, and enable the function of the login application other than the function of the plug-in module.

Further features of the present invention will become apparent from the following description of exemplary embodiments (with reference to the attached drawings).

BRIEF DESCRIPTION OF THE DRAWINGS

The accompanying drawings, which are incorporated in and constitute a part of the specification, illustrate embodiments of the invention and, together with the description, serve to explain the principles of the invention.

DESCRIPTION OF THE EMBODIMENTS

Embodiments of the present invention will be described hereinafter in detail, with reference to the accompanying drawings. It is to be understood that the following embodiments are not intended to limit the scope of the claims of the present invention, and that not all of the combinations of the aspects that are described according to the following embodiments are necessarily required with respect to the means to solve the problems according to the present invention. Note, in this embodiment, explanation will be given for a multi function peripheral (MFP) as example of an information processing apparatus according to the present invention, but the present invention is not limited to this kind of multi function peripheral.

Figure 1:
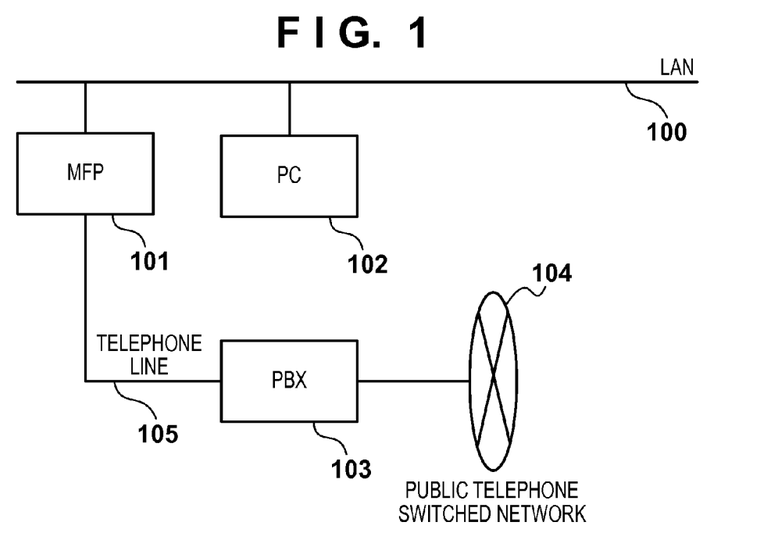
FIG. 1 is a view for illustrating an example configuration of a system including a multi function peripheral (MFP) according to a first embodiment the present invention.

FIG. 1 is a view for illustrating an example configuration of a system including a multi function peripheral (MFP) according to a first embodiment the present invention.

In the system, an MFP 101 and a PC 102 are connected to a LAN 100. The PC 102 operates the MFP 101 remotely. The MFP 101 and a PBX (Private Branch eXchange) 103 are connected via a telephone line 105. The PBX 103 is connected to a public telephone switched network 104, and a FAX function of the MFP 101 is used. Note that the MFP 101 may be directly connected to the public telephone switched network 104.

Figure 2:
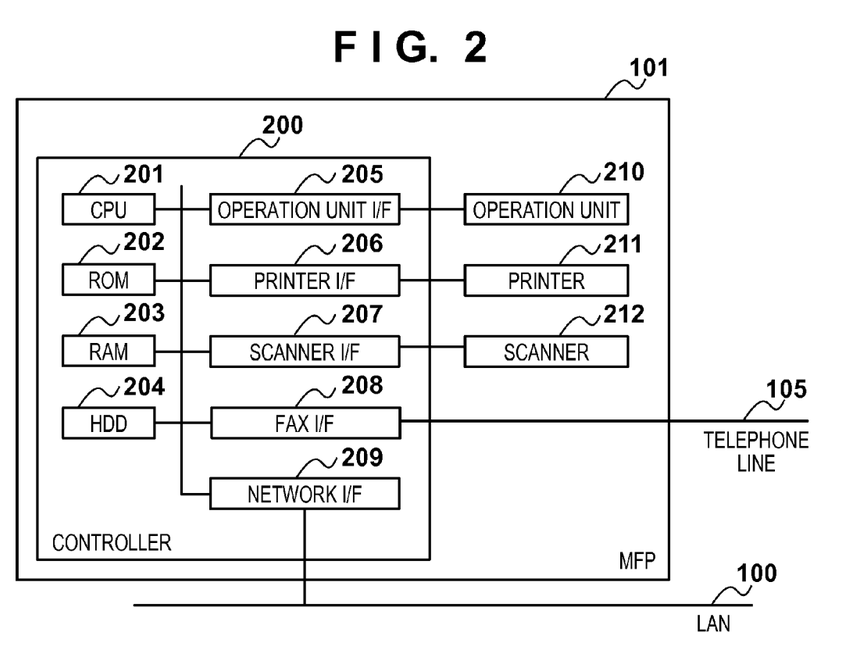
FIG. 2 is a block diagram for explaining a hardware configuration of the MFP according to the first embodiment.

FIG. 2 is a block diagram for explaining a hardware configuration of the MFP 101 according to the first embodiment.

A controller 200, including a CPU 201, controls overall operations of the MFP 101. The CPU 201 performs various control such as reading control of reading out a control program stored in a ROM 202, transmission control, or the like. A RAM 203 is a main memory of the CPU 201, and is used as a temporary storage area such as a work area. An HDD 204 stores image data, various programs, or the like. An operation unit I/F 205 connects an operation unit 210 and the controller 200. A printer I/F 206 connects a printer 211 and the controller 200. Image data to be printed by the printer 211 is transferred to the printer 211 from the controller 200 via the printer I/F 206, and printed onto a printing medium at the printer 211. A scanner I/F 207 connects a scanner 212 and the controller 200. The scanner 212 reads an image on an original, generates image data of the image, and inputs the image data into the controller 200 via the scanner I/F 207. A FAX I/F 208 connects the controller 200 to the telephone line 105. The FAX I/F 208 performs FAX data transmission and receiving with the PBX 103 connected to the telephone line 105, or the public telephone switched network 104. A network I/F 209 connects the controller 200 to the LAN 100. The network I/F 209 receives a request from an external apparatus on the LAN 100 (for example, the PC 102), and transmits a response corresponding to the request.

Figure 3:
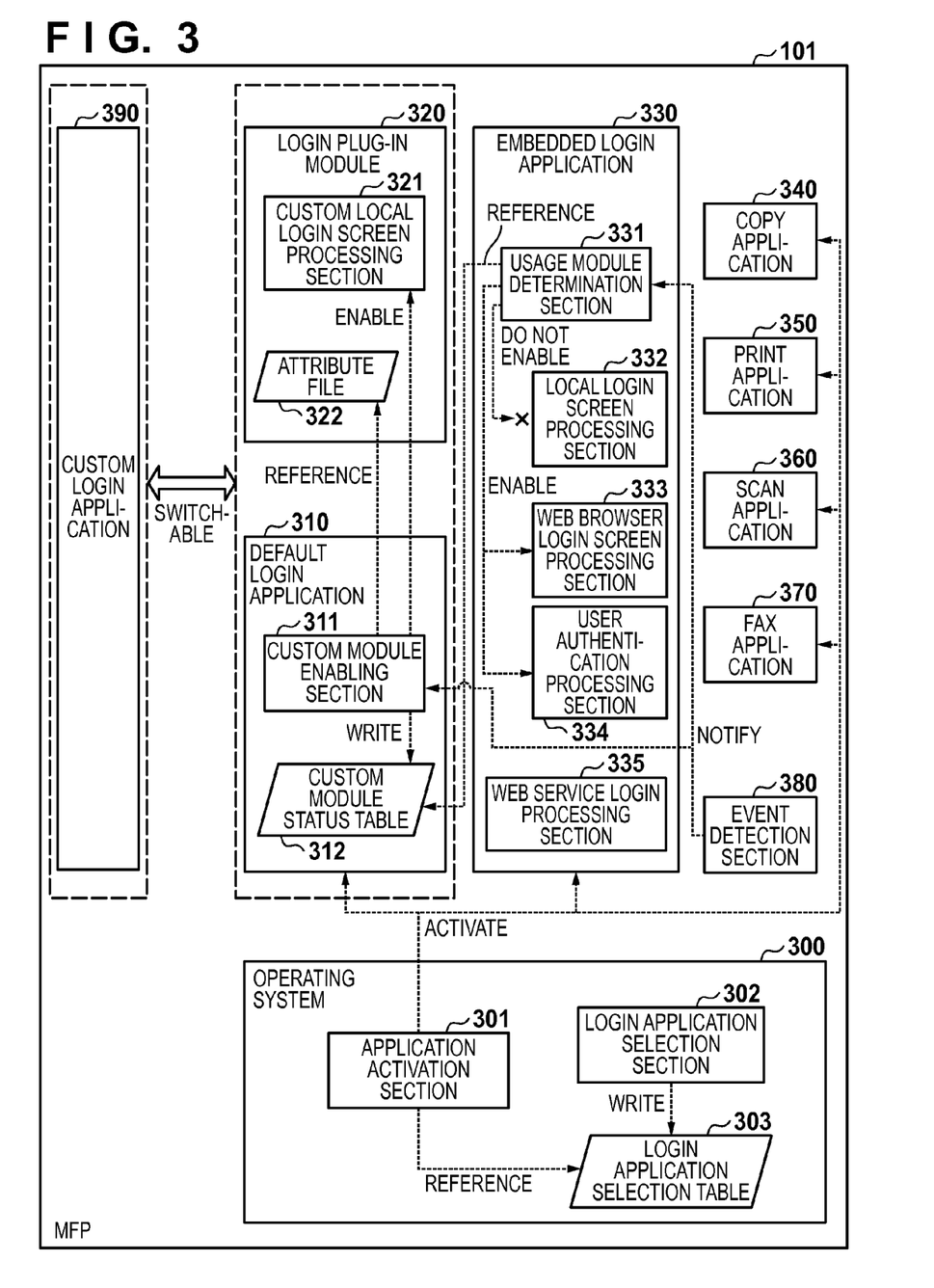
FIG. 3 is a block diagram for explaining a software configuration of the MFP according to the first embodiment.

FIG. 3 is a block diagram for explaining a software configuration of the MFP 101 according to the first embodiment. If not identified specifically, each processing section is a control program stored in the ROM 202, and these control programs are executed by the CPU 201.

An operating system 300 is provided with various functions, and is a foundation for operating the control programs stored in the ROM 202; here explanation will be given for portions related to the nature of the present invention. An application activation section 301 activates applications operating on the operating system 300. A login application selection section 302 selects a login application (explained later) to activate for a user of the MFP 101. As an approach for selecting the login application there is an approach of displaying a UI screen on the operation unit 210, or on a Web browser operated by the PC 102 and allowing a user to select by a user operation via the UI screen. Here, a selected state for the login application that the user selected is registered in a login application selection table 303.

The login applications (an embedded login application 330, a default login application 310, and a custom login application 390) are control programs for executing a function of a login on the MFP 101. The login application to be activated is either the default login application 310 or the custom login application 390. The default login application 310 is a login application that always exists on the MFP 101. The custom login application 390 is a login application created following a conventional customization approach, and must be equipped with a full set of login functions. Also, the custom login application 390 can be plurally installed on the MFP 101.

A result of selecting the login application by the login application selection section 302 is saved in a login application selection table 303 (FIG. 5A) in the HDD 204.

Figure 5A:
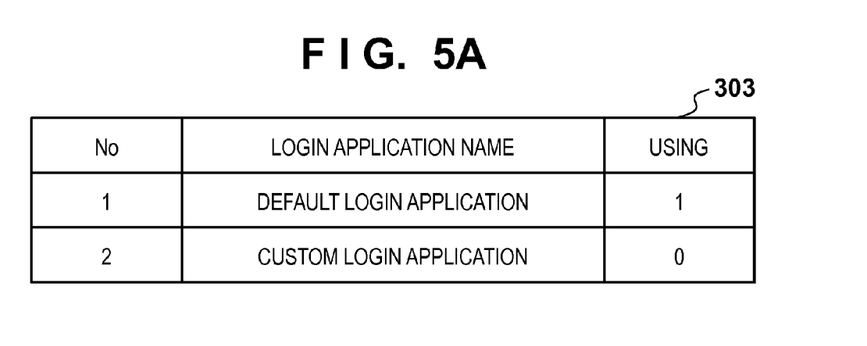
FIG. 5A is a view for illustrating an example of a login application selection table.

FIG. 5A is a view for illustrating an example of the login application selection table 303.

In FIG. 5A, it is shown that a login application, for which a "using" field is "1" (in FIG. 5A this is "default login application"), is selected.

The default login application 310 is a special login application which does not have a login function itself, but has a role of enabling a login function implemented as a custom module in a login plug-in module 320 (later explained). For this, a custom module enabling section 311 references an attribute file 322 (FIG. 5B) existing in the login plug-in module 320, and in accordance with content of the attribute file 322, enables a custom module implemented in the login plug-in module 320. Custom modules generated in the present embodiment are implemented in the login plug-in module 320.

Figure 5B:
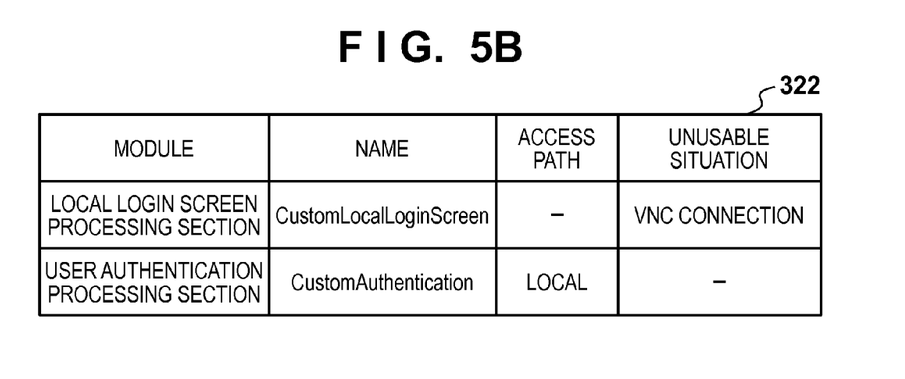
FIG. 5B is a view for illustrating an example of an attribute file.

FIG. 5B is a view for illustrating an example of the attribute file 322.

Here, enabling means reading out a module from the HDD 204 into the RAM 203, and putting the module into a state in which it is executable by the CPU 201. Explanation will be given of an example of a case in which configuration is taken in the Java language, and the process of instantiating a class indicated by a class name described in a "name" field of FIG. 5B corresponds to processing for the enabling.

The login plug-in module 320 is a module stored in the HDD 204 which is automatically installed (added) into the MFP 101. A developer creates custom modules, which are a smallest unit of a login function, and the login function of the MFP 101 is customized by implementing a custom module in the login plug-in module 320. A local login screen processing section, a Web browser login screen processing section, and a user authentication processing section are examples of custom modules. The login plug-in module 320 comprises one or more custom modules.

In FIG. 3, a case in which a custom local login screen processing section 321 exists as an example of a custom module is shown. The custom module enabling section 311 writes a result of enabling a custom module into a custom module status table 312 (FIG. 5C) in the HDD 204.

Figure 5C:
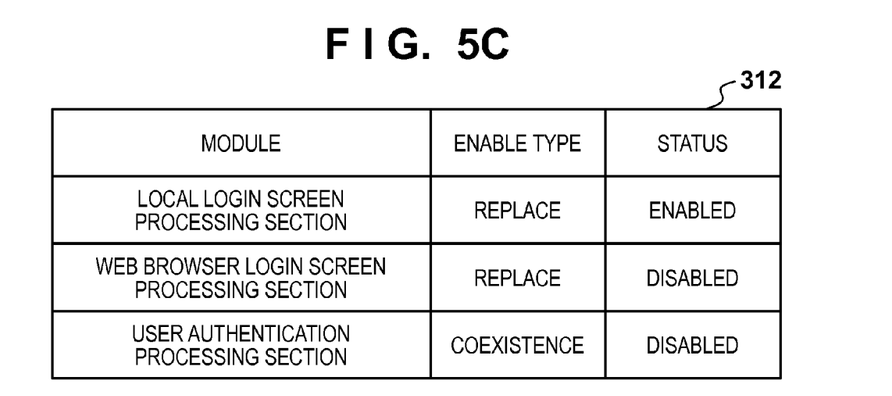
FIG. 5C is a view for illustrating an example of a custom module status table.

FIG. 5C is a view for illustrating an example of the custom module status table 312.

In the custom module status table 312, information of a single module is written in each row. The information includes a module name, an "enable type", and a "status", and explanation of these will be given later.

The embedded login application 330 is provided to the MFP 101 originally, and is a login application that is always activated irrespective of the selection of the user. A usage module determination section 331 references the custom module status table 312, and enables an embedded login module corresponding to a custom module that the login plug-in module 320 does not implement. In the example of FIG. 3, because the login plug-in module 320 has the custom local login screen processing section 321, only a local login screen processing section 332 of the embedded login application 330 is not enabled.

Embedded login modules include the local login screen processing section 332, a Web browser login screen processing section 333, and a user authentication processing section 334, for example. In the first embodiment, the above described three examples are given as embedded login modules, but there may be other modules. Also, a module that is not a target of customization (for example, a Web service login processing section 335) is enabled as well.

A copy application 340, a print application 350, a scan application 360, and a FAX application 370 are control programs for executing a copy function, a printing function, a scanning function, and a FAX function respectively. An event detection section 380 detects whether or not a situation indicated by "unusable situation" of the attribute file 322 occurred. For example, when the event detection section 380 detects that the PC 102 connected to the MFP 101 by VNC (Virtual Network Computing), the event detection section 380 notifies the usage module determination section 331 and the custom module enabling section 311 of the VNC connection.

Figure 4:
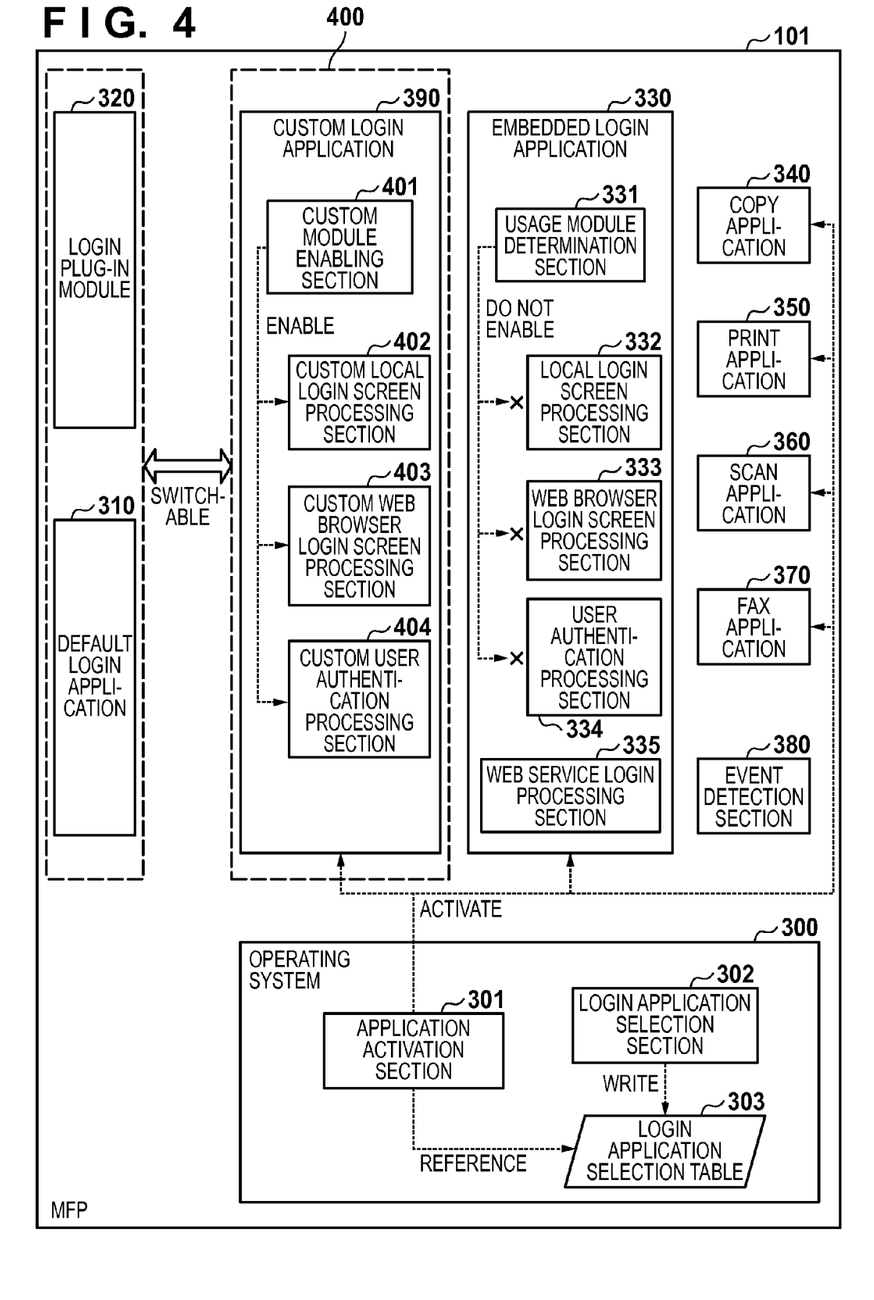
FIG. 4 is a block diagram for explaining a software configuration for a case in which a custom login application operates in the MFP according to the first embodiment.

FIG. 4 is a block diagram for explaining a software configuration for a case in which the custom login application 390 operates in the MFP 101 according to the first embodiment. A difference with FIG. 3 is only in an area shown in a dashed line 400. Also a difference in function is only in the portion relating to enabling of modules of the embedded login application 330. Below, explanation will be given only for the differences with FIG. 3. Note that the state of FIG. 4 corresponds to a case in which the "using" field of the custom login application is set to "1" in the login application selection table of FIG. 5A.

When the custom login application 390 is activated from the application activation section 301, a custom module enabling section 401 enables all of the custom modules. Here the custom modules are a custom local login screen processing section 402, a custom Web browser login screen processing section 403, and a custom user authentication processing section 404. When the custom login application 390 is operating, the usage module determination section 331 does not enable the login modules of the embedded login application 330.

In the first embodiment, it is possible to activate the default login application 310, enable a custom login module implemented in the login plug-in module 320, and perform login processing via screens of the custom login module.

Also, the custom login application 390, which is generated following a conventional customization approach, can be executed as shown in FIG. 4 by setting the "using" field of the login application selection table 303 for custom login applications to "1".

Next, explanation will be given for processing to enable a custom module of the MFP 101 according to the first embodiment, using the flowcharts of FIGS. 6A and 6B.

Figure 6A:
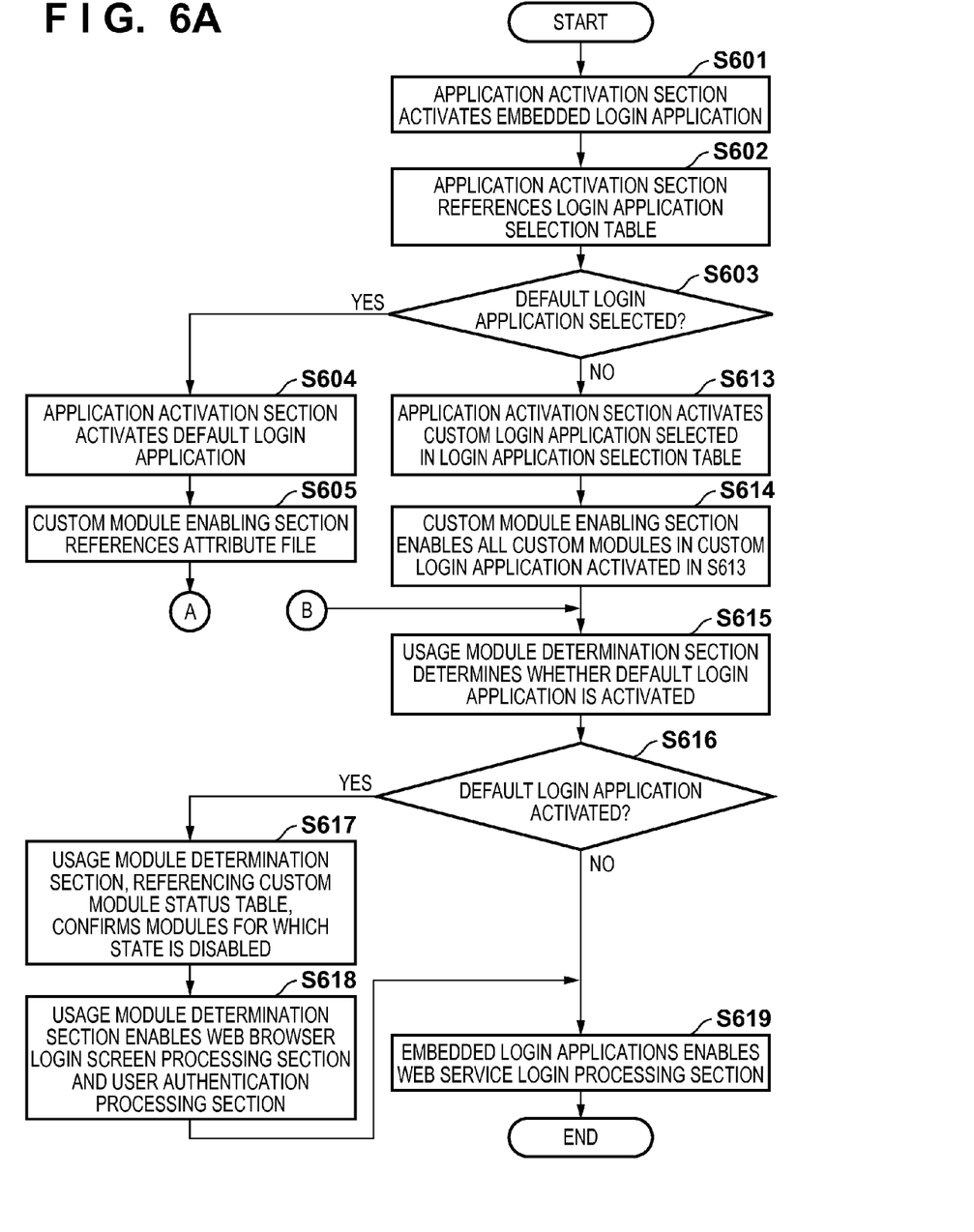
FIGS. 6A and 6B are flowcharts for describing processing for enabling a custom module in the MFP according to the first embodiment.
Figure 6B:
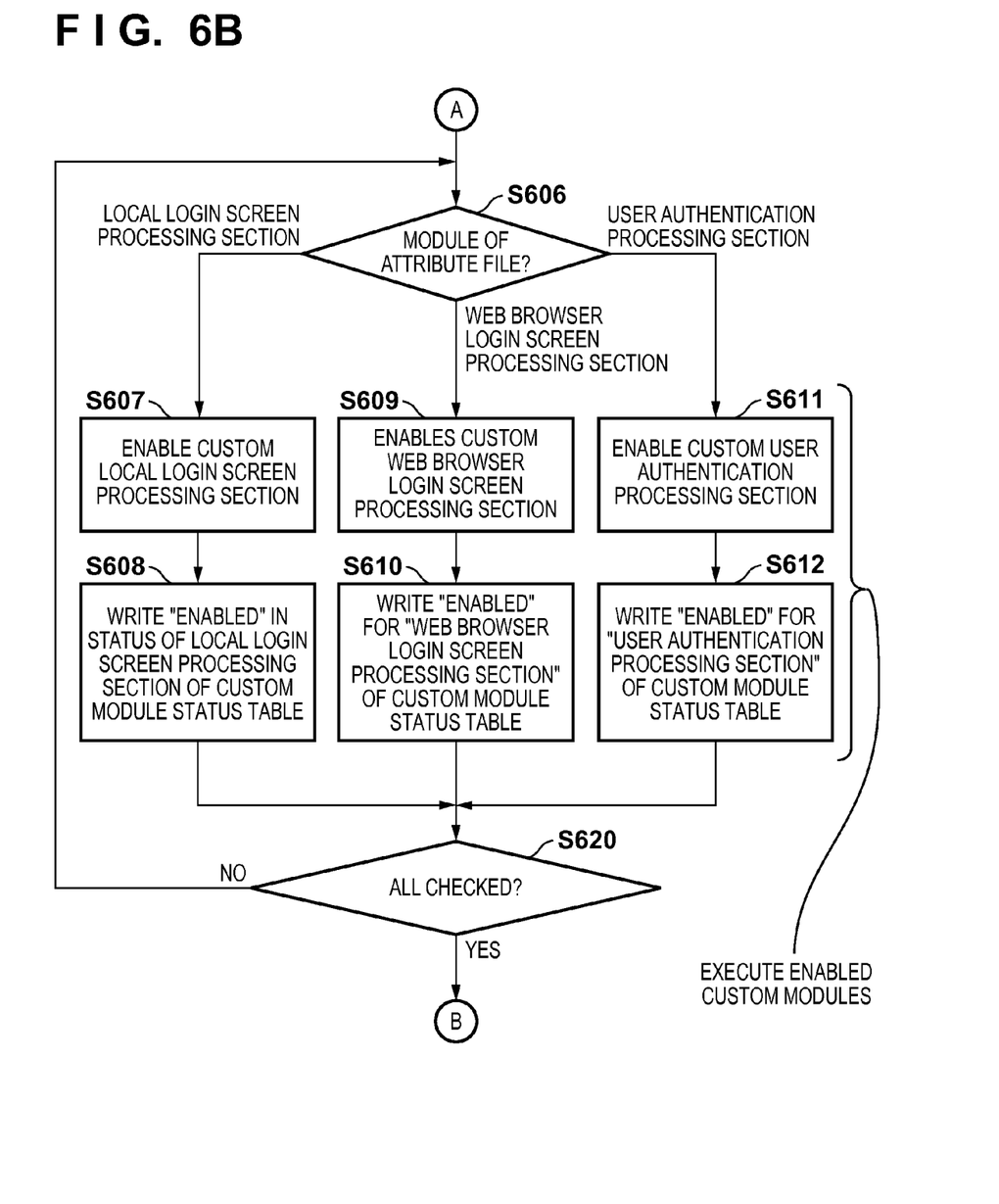

FIGS. 6A and 6B are flowcharts for describing processing for enabling a custom module in the MFP 101 according to the first embodiment. A program for executing this processing is stored in the ROM 202, loaded into the RAM 203 upon execution, and executed under the control of the CPU 201, but here, explanation will be given in accordance with the software configurations of FIG. 3 and FIG. 4.

This processing is started by the MFP 101 being activated. Firstly, in step S601, the application activation section 301 activates the embedded login application 330. Next, the processing proceeds to step S602, and the application activation section 301 references the login application selection table 303. Then, the processing proceeds to step S603, and it is determined whether or not the login application selected in the login application selection table 303 is the default login application 310. Here, in a case where the default login application 310 is selected, as illustrated in FIG. 5A, the processing proceeds to step S604, the application activation section 301 activates the default login application 310, and the processing proceeds to step S605. Meanwhile, in a case where something other than the default login application is selected in step S604, the processing proceeds to step S613, and the application activation section 301 activates the login application selected in the login application selection table 303. Here, in a case where, for example, the custom login application 390 is selected, the custom login application 390 is activated as shown in FIG. 4.

In step S605, the custom module enabling section 311, references the attribute file 322, and in a case where "local login screen processing section" is recited in "module" of the attribute file 322, the processing proceeds to step S607 from step S606. In step S607, the custom module enabling section 311 enables the custom local login screen processing section 321, and the processing proceeds to step S608. In step S608, the custom module enabling section 311 writes "enabled" in the "status" field of "local login screen processing section" of the custom module status table 312, and the processing proceeds to step S620. In step S620, the custom module enabling section 311 investigates whether checking of all of the modules registered in the attribute file 322 has completed; if the checking has completed, the processing proceeds to step S615, if not the processing returns to step S606.

In a case where "Web browser login screen processing section" is recited in "module" of the attribute file 322 in step S606, the processing proceeds to step S609. In step S609, the custom module enabling section 311 enables the custom Web browser login screen processing section (not shown), and the processing proceeds to step S610. In step S610, the custom module enabling section 311 writes "enabled" in "status" for "Web browser login screen processing section" of the custom module status table 312, and the processing proceeds to step S620.

Also, in a case where "user authentication processing section" is recited in "module" of the attribute file 322 in step S606, the processing proceeds to step S611, the custom module enabling section 311 enables the custom user authentication processing section (not shown), and the processing proceeds to step S612. In step S612, the custom module enabling section 311 sets the "status" of "user authentication processing section" of the custom module status table 312 to "enabled", and the processing proceeds to step S620.

Meanwhile, when the login application selected in the login application selection table 303 in step S603 is not the default login application 310, the processing proceeds to step S613. In step S613, the application activation section 301 activates, for example the custom login application 390, selected in the login application selection table 303. Then, the processing proceeds to step S614, the custom module enabling section 401 of the custom login application 390 enables all of the custom modules of the custom login application 390, and the processing proceeds to step S615. Here the custom modules are the custom local login screen processing section 402, the custom Web browser login screen processing section 403, and the custom user authentication processing section 404 of FIG. 4.

In step S615, the usage module determination section 331 determines whether or not the default login application 310 is activated. An approach to activation confirmation is for the usage module determination section 331 to determine whether or not the custom module status table 312 is accessible. Then, the processing proceeds to step S616, and the usage module determination section 331 determines whether or not the activated login application is the default login application 310. This is done by determining whether or not the login plug-in module 320 can be executed under the default login application 310.

When the default login application 310 is not activated, the processing proceeds to step S619, and if the default login application 310 is activated, the processing proceeds to step S617. In step S617, the usage module determination section 331, referencing the custom module status table 312, does not enable the local login screen processing section 332 having the same function as the module (the local login screen processing section of FIG. 5C) for which the "status" field is "enabled". Also, the usage module determination section 331 distinguishes a module for which the "status" field is "disabled", and the processing proceeds to step S618. In step S618, the usage module determination section 331 enables the Web browser login screen processing section 333 and the user authentication processing section 334, which are set to "disabled" in the example of FIG. 5C, and the processing proceeds to step S619. This is because, when the custom login module of the login plug-in module 320 is executed, the Web browser login screen display function and the user authentication function are made to be executable. Then, the processing proceeds to step S619, the embedded login application 330 enables the Web service login processing section 335, and the processing completes.

Note that in the above described explanation, the custom module status table 312 is used for distinguishing whether or not the custom modules are enabled, but another confirmation approach may be used if it is an approach by which it is possible to determine whether or not the custom modules are enabled for each customized module. For example, a distinguishing approach in which the default login application 310 is provided with an API for responding to a query of whether the custom modules are enabled may be used.

As explained above, by virtue of the first embodiment, it is possible to activate the default login application 310 and execute the custom login modules of the login plug-in module 320. Here, the custom module enabling section of the default login application references the custom module status table, and determines the enabled custom modules. Here, the login modules out of the embedded login applications corresponding to these custom modules are set to be disabled.

Also, by activating the custom login application, it is possible to operate the custom login application 390, which is generated following a conventional customization approach.

Next, explanation will be given, with reference to the flowchart of FIG. 7, for processing for a case where, in a state in which the custom module is enabled, a user actually performs a login operation. Note that explanation is given for a case in which the user operates the operation unit 210 in the first embodiment as an access path to the MFP 101. While the login screen processing section differs, the flow of the processing is the same as in the case where the user operates the operation unit even in a case of another access path, such as when, for example, the user accesses from a Web browser.

Figure 7:
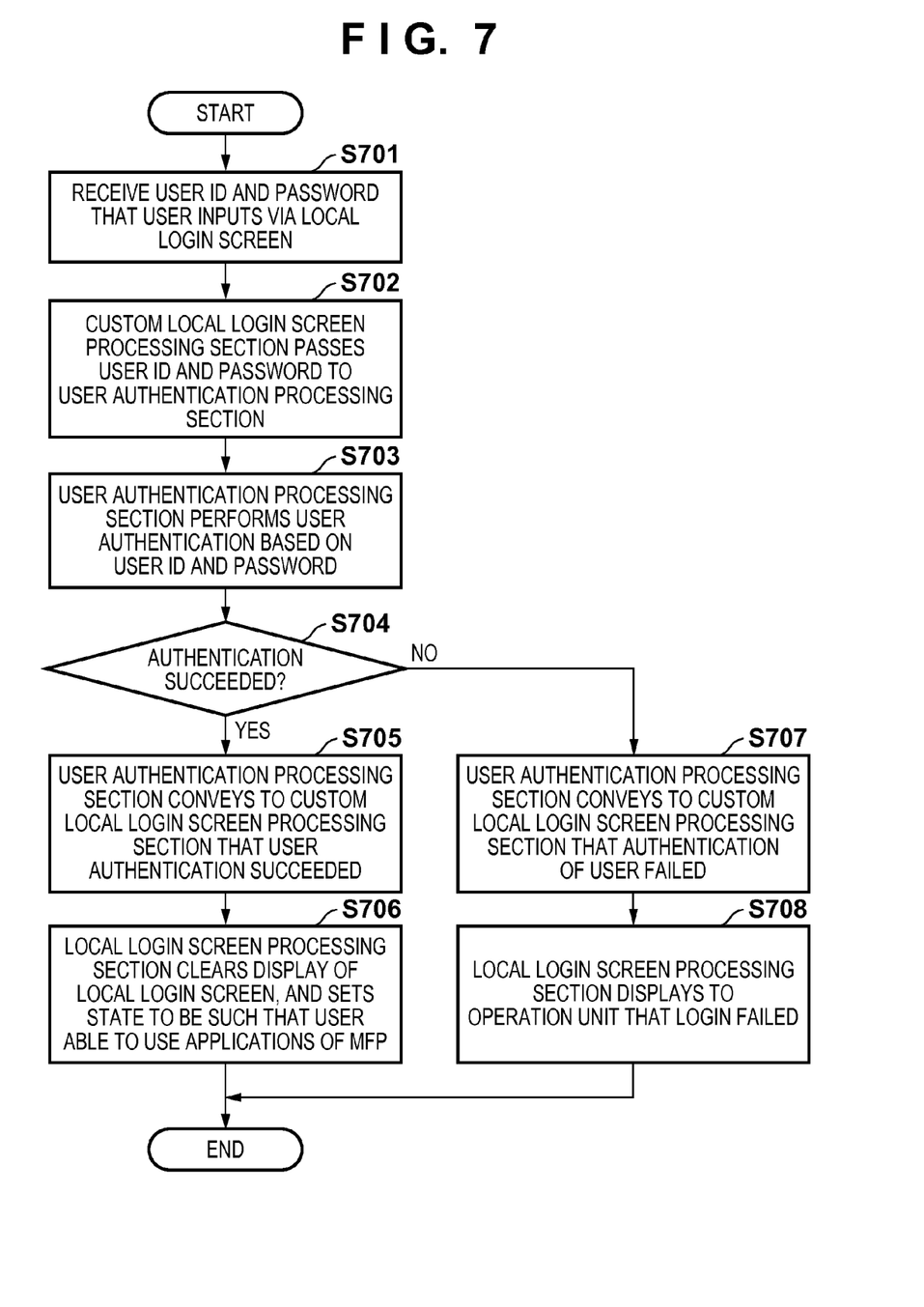
FIG. 7 is a flowchart for describing user authentication processing for when the MFP according to the first embodiment executes a custom local login.

FIG. 7 is a flowchart for describing user authentication processing for when the MFP 101 according to the first embodiment executes a custom local login. A program for executing this processing is stored in the ROM 202, loaded into the RAM 203 upon execution, and executed under the control of the CPU 201.

Firstly, the custom local login screen processing section 321, in step S701, receives a user ID and a password that the user inputs by operating a local login screen displayed on the operation unit 210. Here, the local login screen is displayed by either the local login screen processing section 332, the custom local login screen processing section 321 or the custom local login screen processing section 402. Hereinafter, these processing sections will be referred to as "local login screen processing section" collectively.

Next, the processing proceeds to step S702, and the custom local login screen processing section 321 passes the user ID and the password that the user inputs in step S701 to a user authentication processing section. This user authentication processing section is either the user authentication processing section 334, a custom user authentication processing section in the login plug-in module 320 (not shown), or the custom user authentication processing section 404 of the custom login application 390.

Next, the processing proceeds to step S703, and the user authentication processing section performs user authentication based on the user ID and the password passed in step S702. Next, in step S704 it is determined whether or not authentication of the user succeeded; in a case where it is determined that the user authentication succeeded, the processing proceeds to step S705, and the user authentication processing section conveys to the custom local login screen processing section 321 that the user authentication succeeded. With this, the processing proceeds to step S706, and the custom local login screen processing section 321 clears the display of the local login screen of the operation unit 210, and sets the state to be such that the user is able to use the functions (applications) of the MFP 101, and the processing completes.

Meanwhile, in a case where it is determined that the authentication of the user failed in step S704, the processing proceeds to step S707, and the user authentication processing section conveys to the custom local login screen processing section 321 that the authentication of the user failed. Then, the processing proceeds to step S708, the custom local login screen processing section 321 displays to the operation unit 210 that the user is not able to login because the authentication failed, and the processing completes. In such a case, the user cannot use the functions (applications) of the MFP 101.

In this way, in the first embodiment, in a state where the custom modules are enabled, the Web browser login screen processing section and the user authentication processing section, which are the embedded login applications, are enabled. Therefore, even in a case where the user performs the login operation, it can be determined whether or not the user is able to use the applications of the MFP by performing the authentication of the user.

Second Embodiment

Explanation will be given for a second embodiment of the present invention. In the previously described first embodiment, in step S617 and in step S618, only modules that are disabled in the custom module status table 312 are enabled. This is an arrangement for setting so that for the same type of module, only one is enabled. However, as with the user authentication processing section 334, there are modules that have the property that they may exist plurally in the system. So, in the second embodiment, explanation will be given for an approach for plurally enabling modules of the same type. Note that the configuration of the MFP 101 according to the second embodiment, and the system configuration, are the same as those of the previously described first embodiment, and their explanation will be omitted.

As shown in FIG. 5C, modules for which "enable type" in the custom module status table 312 is "replace", are enabled in step S618 as explained in the first embodiment.

Meanwhile, in a case where "enable type" is "coexistence", irrespective of whether "disabled" or "enabled" is set in the custom module status table 312, the module is enabled.

With this, an effect is achieved in that, for modules for which the enable type is "coexistence", both the custom modules that the login plug-in module implements and the embedded login modules are enabled.

Third Embodiment

Explanation will be given for a third embodiment of the present invention. In the previously described first embodiment, in a case where the custom user authentication processing section 404 is enabled, the custom user authentication processing section can be used irrespective of the access path by which the user operates the MFP 101. An access path may be, for example, a path of operating the MFP 101 via the operation unit 210, or a path of operating the MFP 101 through a Web browser operating on the PC 102. However, in a case where there is a desire to disallow usage of the custom user authentication processing sections depending on the access path, there is a problem in the above described operation.

So, in the third embodiment, explanation will be given for an approach in which, when the MFP 101 is operated by a particular access path, a custom user authentication processing section is made to be usable. Note that the configuration of the MFP 101 according to the third embodiment, and the system configuration, are the same as those of the previously described first embodiment, and their explanation will be omitted.

As shown in FIG. 5B, in a case where "access path" of the attribute file 322 is "local", a UI that can be used for user authentication processing is displayed on a local login screen. One approach to doing this is to display "login destination" on the login screen, for example, and to display the names of the custom user authentication processing sections as options for "login destination".

In a case where "access path" of the attribute file 322 is "Web browser", a UI is displayed on the Web browser login screen so that user authentication processing can be used.

By the above processing, an effect can be obtained by which it is possible to make the custom user authentication processing section usable only in a case where the MFP 101 is accessed by a particular access path.

Fourth Embodiment

Explanation will be given for a fourth embodiment of the present invention. In the above described first embodiment, the custom modules that the login plug-in module implements are always enabled. However, there are cases where, based on the state, it is undesirable that custom modules be enabled. For example, there are cases in which a custom local login screen is of a design where user is prompted to touch an IC card to an IC card reader, and in which the user makes a VNC connection from the PC 102 to the MFP 101. In such a case, because the user cannot touch with an IC card, this kind of login screen is meaningless.

So, in the fourth embodiment, explanation will be given, with reference to FIG. 8, for an approach in which, based on the state, a custom module is disabled, and a corresponding module of the embedded login application 330 is enabled. Note that the configuration of the MFP 101 according to the fourth embodiment, and the system configuration, are the same as those of the previously described first embodiment, and their explanation will be omitted.

Figure 8:
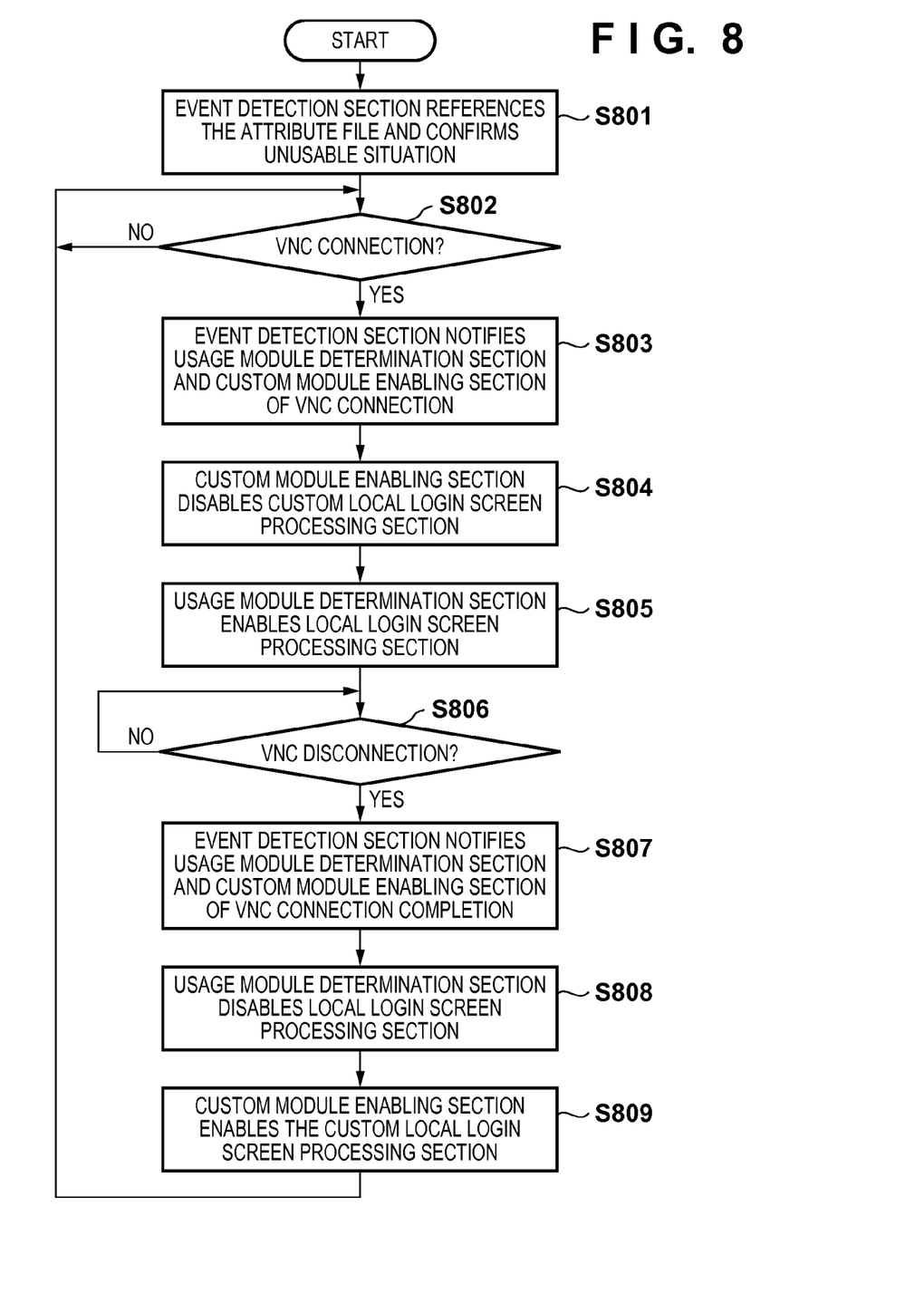
FIG. 8 is a flowchart for describing processing of the MFP according to a fourth embodiment.

FIG. 8 is a flowchart for describing processing of the MFP 101 according to a fourth embodiment. A program for executing this processing is stored in the ROM 202, loaded into the RAM 203 upon execution, and executed under the control of the CPU 201.

Firstly, in step S801, the event detection section 380 references the attribute file 322 and confirms "unusable situation". In the case of FIG. 5B, "unusable situation" is "VNC connection". Next, the processing proceeds to step S802, and the event detection section 380 checks periodically whether or not "VNC connection", confirmed in step S801, occurred. When, in step S802, the event detection section 380 detects the VNC connection, the processing proceeds to step S803, and notifies the usage module determination section 331 and the custom module enabling section 311 that the VNC connection is detected. Next, the processing proceeds to step S804, and the custom module enabling section 311, having received the notification, disables the custom local login screen processing section 321. Also, in step S805, the usage module determination section 331 enables the local login screen processing section 332. Here, the state entered is one in which rather than the login screen of the login plug-in module 320, the login screen of the embedded login application 330 is displayed to the user who performed the VNC connection.

After this, when, in step S806, the event detection section 380 detects that the VNC connection has been completed, the processing proceeds to step S807, and notifies the usage module determination section 331 and the custom module enabling section 311 that the VNC connection has been completed. Then, the processing proceeds to step S808, and the usage module determination section 331, having received the notification, disables the local login screen processing section 332. Then, in step S809, the custom module enabling section 311 enables the custom local login screen processing section 321. With this, a state in which a login screen by a custom login module of the login plug-in module 320 is displayed on the operation unit 210 of the MFP 101. Thereafter, the processing returns to step S802, and the previously described processing is repeated.

As explained above, by the fourth embodiment, the user is able to use a login function of a login module of the embedded login application 330 rather than a custom login module of the login plug-in module 320, depending on the state. With this, an effect is achieved in that, when an "unusable situation" for a custom login module occurs, a login module of the embedded login application is executed, and an occurrence of a problem due to the custom login module can be prevented.

Note that in the fourth embodiment, explanation was given for an example of the VNC connection as the situation, but switching between enabling and disabling may be performed in accordance with the occurrence of other situations. Other situations may be, for example, a USB cable detachment, a network failure, or the like.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2013-244332, filed Nov. 26, 2013, which is hereby incorporated by reference herein in its entirety.

What is claimed is:

1. An information processing apparatus comprising:
a processor, and
a memory having instructions stored therein, which, when the instructions are executed by the processor, cause the processor to:
(a) manage a login application at least having both a login screen display function and a user authentication function;
(b) determine whether or not a plug-in module added to the information processing apparatus has the login screen display function and to determine whether or not the plug-in module has the user authentication function;
(c) enable the login screen display function of the plug-in module if it is determined that that the plug-in module has the login screen display function, and enable the login screen display function of the login application otherwise; and
(d) enable the user authentication function of the plug-in module if it is determined that the plug-in module has the user authentication function, and enable the user authentication function of the login application otherwise.

2. The information processing apparatus according to claim 1,
wherein each function of the plug-in module is enabled by referencing an attribute file of the plug-in module.

3. The information processing, apparatus according to claim 2,
wherein the memory has further instructions stored therein, which when the instructions are executed by the processor, cause the processor to store a status of each function of the plug-in module, and determine whether or not each function of the plug-in module is enabled by referencing the corresponding stored status, wherein each function of the login application is enabled in accordance with determining that the corresponding function of the plug-in module is not enabled.

4. The information processing apparatus according to claim 3, further comprising an API by which it can be confirmed whether or not the function of the plug-in module is enabled, wherein it is determined, based on the API, whether or not each function of the plug-in module is enabled.

5. The information processing apparatus according to claim 2, wherein the memory has further instructions stored therein, which when the instructions are executed by the processor, cause the processor to store either a coexistence with the login application or a replacement of the login application as a status of each function of the plug-in module.

6. The information processing apparatus according to claim 1, wherein the memory has further instructions stored therein, which when the instructions are executed by the processor, cause the processor to cause a display unit to display a local login screen or a Web browser login screen, depending on whether or not the login screen display function of the plug-in module is enabled.

7. The information processing apparatus according to claim 1, wherein the memory has further instructions stored therein, which when the instructions are executed by the processor, cause the processor to disable each function of the plug-in module and enable the corresponding function of the login application when an occurrence of a situation in which the plug-in module cannot be used is detected.

8. The information processing apparatus according to claim 1, wherein the display function includes a display of a login screen by a Web browser.

9. A method of controlling an information processing apparatus that manages a login application at least having both a login screen display function and a user authentication function, the method comprising:
determining whether or not a plug-in module added to the information processing apparatus has the login screen display function;
determining whether or not the plug-in module has the user authentication function;
enabling the login screen display function of the plug-in module if it is determined that the plug-in module has the login screen display function, and enabling the login screen display function of the login application otherwise; and
enabling the user authentication function of the plug-in module if it is determined that the plug-in module has the login screen display function, and enabling the user authentication function of the login application otherwise.

10. A non-transitory computer-readable storage medium storing a program for causing a computer that manages a login application including (1) a login screen display function and (2) a user authentication function to execute:
determining whether or not a plug-in module added to the information processing apparatus has the login screen display function;
determining whether or not the plug-in module has the user authentication function;
enabling the login screen display function of the plug-in module if it is determined that the plug-in module has the login screen display function, and enabling the login screen display function of the login application otherwise; and
enabling the user authentication function of the plug-in module if it is determined that the plug-in module has the login screen display function, and enabling the user authentication function of the login application otherwise.

* * * * *